United States Patent [19]
Reynolds

[11] 3,845,547
[45] Nov. 5, 1974

[54] METHOD OF MANUFACTURING A LAMINATED ASSEMBLY

[75] Inventor: Hugh B. Reynolds, Rome City, Ind.

[73] Assignee: General Electric Company, Fort Wayne, Ind.

[22] Filed: May 12, 1971

[21] Appl. No.: 142,594

[52] U.S. Cl. .................. 29/596, 29/423, 72/364, 72/370, 148/130
[51] Int. Cl. .......................................... H02k 15/00
[58] Field of Search ............ 29/596, 598, 609, 423, 29/447; 72/342, 363, 364, 367, 368, 369, 370; 310/216; 148/130

[56] References Cited
UNITED STATES PATENTS

| | | | |
|---|---|---|---|
| 1,934,903 | 11/1933 | Apple | 172/36 |
| 2,205,783 | 6/1940 | Arutunoff | 72/369 X |
| 2,654,940 | 10/1953 | Law | 29/447 X |
| 3,002,119 | 9/1961 | Lindstrom | 310/260 |
| 3,030,528 | 4/1962 | DeJean | 310/42 |
| 3,050,613 | 8/1962 | Sheinhartz et al. | 29/447 X |
| 3,136,650 | 6/1964 | Avila | 117/21 |
| 3,298,096 | 1/1967 | Stuart | 72/342 |
| 3,383,900 | 5/1968 | Hartesveldt | 72/364 X |
| 3,464,107 | 9/1969 | Geisenhaver | 29/596 |
| 3,490,143 | 1/1970 | Hull | 29/596 |

Primary Examiner—Richard J. Herbst
Assistant Examiner—Carl E. Hall

[57] ABSTRACT

Method of manufacturing and confirming or establishing preselected dimensional relationships along selected surface portions of assemblies. As disclosed, preferred form includes selecting dimensional relationship establishing means having coefficient of thermal expansion different than that of the selected surface portion defining material of the assembly; placing such means in proximity to the selected surface; transferring heat to or from such means and surface material to differentially expand or contract such means and surface material; forcing the surface to conform to such means, transferring heat relative to such means and surface to return the same to an initial thermal state; and separating such means and surface portions. Transferring heat to or from the selected surface portions and means may advantageously be performed concurrently with other manufacturing steps. The selected surface portions may (particularly in the case of a dynamoelectric machine assembly) include bore defining surfaces, outer peripheral surfaces, restricted slot entrance surfaces and winding surfaces, to name but a few.

13 Claims, 14 Drawing Figures

METHOD OF MANUFACTURING A LAMINATED ASSEMBLY

BACKGROUND OF THE INVENTION

This invention relates to methods of manufacturing laminated products and, more specifically, to a new and improved method of manufacturing laminated dynamoelectric machine assemblies particularly adapted for use as a motor part.

In the manufacture of dynamoelectric machines and dynamoelectric machine parts, it is common practice to form a laminated assembly that includes a plurality of laminations each comprising electrical conductor accommodating passageways and a central bore. In thelcase of a movable dynamo-electric machine part, such as a rotor, the electrical conductors may be in the form of windings which are manually or machine placed in the winding accommodating passageways. Alternatively, the electrical conductors may be formed by utilizing conventional die casting techniques to form die cast rotor conductor bars and (if desired) end rings. These may be as described for example in the Jerome N. C. Chi, U.S. Pat. No. 3,075,106, having an issue date of Jan. 22, 1963 and assigned to the assignee of the present application. For most types of rotor construction, the central bore of a laminated rotor body is formed to accommodate a shaft. This shaft is constrained to rotate with a rotor.

In the case of stator cores, a plurality of laminations are secured together and the winding accommodating slots normally accommodate turns of copper or aluminum conductors. In many cases, the bore of a stator is designed to accommodate a rotor with a predetermined and desirably minimum but uniform air gap separating the outer peripheral surface of the rotor from the internal bore of the stator. It will, however, be appreciated that the relative relationship between the rotor and the stator parts may be reversed as in the case of "inside out" motors.

The laminations comprising the magnetic core of either the rotor or stator may be secured together by one or more weld beads. One example of this type of construction is illustrated in A. L. Rediger U.S. Pat. No. 3,012,162, dated Dec. 5, 1961 and assigned to the assignee of the present application. On the other hand, the laminations may be held together by following the teachings in the B. B. Hull U.S. Pat. No. 3,490,143 and Re. 26,788, having issue dates of Jan. 20, 1970 and Feb. 10, 1970, respectively. Both of these Hull patents are also assigned to the assignee of the present application. As taught, inter alia, by the Hull patent disclosures, laminations for a magnetic core may be secured together by the use of interlaminate adhesive material. In addition, welds may be used if desired.

Whether the laminated assembly is to be used as an inner motor part (e.g., as a rotor) or as an outer motor part (e.g., as a stator) it is extremely desirable that the internal bore thereof be uniformly concentric about a central axis extending along the bore. In the case of internal rotors, a properly sized, uniform and concentric bore is desirable in order to permit satisfactory assembly of the rotor with a central shaft, whether such shaft has a round or nonround (e.g., square or rectangular) shape in cross section. If the central bore is undersized relative to the shaft to be assembled therewith, increased manufacturing costs must be endured, by machining the rotor bore to a specified dimension. On the other hand, laminated rotor bodies with oversize bores are frequently scrapped in order to avoid preparing shafts which are oversized to fit the rotor bore and machined at one or more ends thereof to co-operate with a preselected bearing means.

In the case of rotor bodies manufactured for use by compressor manufacturers, rotor bodies with oversized, or "crooked" bores (which would become oversized if machined to be straight and concentric), are often scrapped, since the bores inthese parts must satisfactorily interfit with shafts that are usually provided by the compressor manufacturer.

Although some of the problems associated with the manufacture of rotors have been described at the outset, these problems are normally even more difficult to resolve in the manufacture of wound or unwound laminated assemblies intended for use as stators. In the case of stators, a plurality of secured together laminations must have bore defining surfaces that concentrically accommodate a rotor and define a uniform air gap therewith. For operational performance reasons, this air gap desirably is as small as may be consistently obtained with available manufacturing techniques, processes and equipment.

Heretofore, during the manufacture of laminated stator cores, it has been a common practice (and particularly so that stators intended for compressor and other rigorous applications) to inspect and monitor the quality of the stator bore during several different stages of manufacture.

For example, in the manufacture of some hermetic stators, it has been common practice to stack and hold a preselected number of laminations on a suitable tool such as a mandrel and weld or otherwise secure the laminations together. In this process, the laminations may be held on the suitable tool as described in more detail, for example, in the Balke U.S. Pat. No. 2,838,703 that issued June 10, 1958 (assigned to the assignee of the present application). Then, when indicated to be necessary by inspection, a machining step may be performed on the bore defining inner surfaces of the core in order to establish a straight and uniformly concentric bore along the central axis of the core.

Subsequently, thermal responsive adhesive material may be applied to the stack of laminations and hardened to form an interlaminate adhesive layer, either while the laminations aree in a "free state" or in a "restricted state." A "restricted state" existsq for example, when the laminations are held in a compressed condition at spaced apart locations while the thermal responsive material is hardened. The bore of the stator then is inspected for uniformity and concentricity and a similar inspection may be made of the outer surface of the stator core.

Prior to arranging windings on the core, if inspection reveals that the stator bore is undersized or is of a desired diameter or less but also "crooked" (i.e., bowed or nonuniform from one end face to the other of the core) remedial manufacturing steps will be performed to correct these "tight bore" conditions. A more common one of the "rework" or remedial steps involves enlarging and straightening the bores, care being taken to not destroy the core by establishing an "oversize bore" condition. At this point it is again noted that if, at any inspection, an "oversize bore" condition is observed in a laminated assembly, such assembly is scrapped.

Subsequently, windings are disposed in the core slots. The assembly may then be further treated, for example by impregnating all or part of the windings with an insulating material often referred to as "varnish." The assembly then is baked at elevated temperatures until the insulating material is hardened. Thereafter, the stator bores may again be machined, if inspection shows that undersize or nonuniform bore conditions have developed since the last previous bore inspection. In the bore machining operations referred to above, one of the more common practices is to burnish the bore surfaces with a roller burnishing tool of the type sold commercially by the Gustaf Wiedeke Company of Dayton, Ohio.

It will be appreciated from the foregoing that although one or more inspections may reveal satisfactory bore conditions, the bore conditions may change during subsequent stator manufacturing operations. In fact, it has now been observed that after two weeks or less of warehouse storage, the bores of previously acceptable stators can become warped or bowed.

The reasons for these changes in laminated core configurations are not fully understood, but it will be appreciated that it would be extremely desirable to provide means and methods that would reliably correct crooked and non-concentric bore conditions without requiring expensive machining operations. It would be even more desirable to provide means and methods whereby tight bore conditions (e.g., crooked and/or non-concentric bores) could be reliably and permanently prevented or eliminated. In addition to saving manufacturing and scrap expense, a solution for the above problems would also desirably reduce, if not eliminate, the time consuming and costly repetitious bore inspections mentioned above.

Accordingly, it will be appreciated that it would be desirable to provide a new and improved process which would reduce the frequency of, if not eliminate, the inspection and remedial machining of laminated assemblies. The magnitude of potential savings will be appreciated by noting that, in the production of some models of motor stators, a bore machining operation has been performed one or more times on from 12 to 50 percent of the assembled cores after lamination stack assembly.

Still another problem that has not been satisfactorily overcome heretofore has been associated with maintaining desired uniform and smooth surfaces along the restricted slot entrances of a laminated core assembly. Uneven slot entrances may be caused, for example, by misalignment from one lamination to another in the stack. When this condition exists, the insulation on windings being placed in the core slots is more apt to be damaged. This may result whether the windings are placed by a gun type winder; or coil turn developing and/or placing apparatus as described for example in: Smith U.S. Pat. Nos. 3,510,939 and 3,514,837; Cutler and Smith U.S. Pat. No. 3,522,650; the copending application of Richard B. Arnold and Dallas F. Smith Ser. No. 806,057, filed Mar. 11, 1969; or Adamson U.S. Pat. No. 2,432,267. It will thus be understood that it would be desirable to overcome the above, as well as other problems, as will become more apparent from the following description.

Accordingly, it is a general object of the present invention to provide a new and improved method of establishing predetermined dimensional relationships along selected surface portions of a laminated structure.

It is still another object of the present invention to provide a new and improved method of establishing uniformly concentric bores in a laminated assembly and thereby reduce, if not eliminate, repetitious inspection and remedial manufacturing procedures.

It is a more specific object of the present invention to provide a new and improved method for the manufacture of a laminated assembly utilizing differential coefficients of thermal expansion to establish desired dimensional relationships in the assembly.

SUMMARY OF THE INVENTION

In carrying out one or more of the above objects, I provide, in one form, a method of manufacturing laminated assemblies and of confirming or establishing preselected dimensional relationships along selected surface portions of the assemblies. A preferred method, in one form, includes selecting dimensional relationship establishing means (sometimes referred to herein as "dimensioning means" for brevity) having a coefficient of thermal expansion and contraction different from the coefficient of thermal expansion and contraction of the material of which the selected surface portions are made; positioning the dimensional relationship establishing means in proximity to the preselected surface of the assembly; changing the thermal state of the selected surface material and dimensional relationship establishing means from an initial thermal state to a second thermal state by transferring heat relative thereto; and returning the surface material and member to the initial thermal state thereof by transferring heat relative thereto and thereby establishing preselected dimensional relationships by the differential expansion or contraction of the selected surface material and dimensional relationship establishing means. Thereafter, the dimensional relationship establishing means is moved from the laminated assembly with the assembly having the desired preselected dimensional relationships along the selected surface portions thereof.

The method actually used may include the steps of applying unhardened but hardenable material (for example material that will be an adherent insulating material when hardened) to at least selected portions of a dynamoelectric machine assembly, and hardening the hardenable material while effecting the preselected dimensional relationships.

In one application, the preselected assembly surface may be the bore defining surface of a rotor or stator core. In this case, the preselected dimensional relationship establishing means is a generally cylindrical plug and may include axially extending ribs for disposition within restricted slot entrances of the core. Preferably, the dimensional clearances between the plug surfaces and laminated core bore (and, if applicable, slot entrances) are selected so that the plug may be hand placed or gently urged, as with a soft headed mallet, into proximate relation with the selected surface portions of the core. It is also preferred that the plug be fabricated from a material selected to have a thermal coefficient of expansion sufficiently greater than that of the core such that, upon heating the core and plug, preselected dimensional relationships are established for the bore surfaces.

In another form, I establish preselected dimensional relationships along selected surface portions of windings. In yet another form, preselected dimensional relationships are established along the surfaces of restricted slot entrances. In the preferred form, the invention is both efficient and economical to practice and has proved to be consistently reliable in producing the desirable results referred to hereinabove.

The subject matter which I regard as my invention is particularly pointed out and distinctly claimed in the concluding portion of this specification. My invention itself, however, both as to its organization and method of operation, together with further objects and advantages thereof, may be best understood by reference to the following description taken in connection with the accompanying drawings wherein:

BRIEF DESCRIPTION OF THE DRAWINGS

FIGS. 1 through 5 schematically represent steps that may be followed in the practice of the invention in a preferred form thereof and wherein:

DESCRIPTION OF THE PREFERRED EMBODIMENTS

Figures 1, 2, 3, 4, 5:
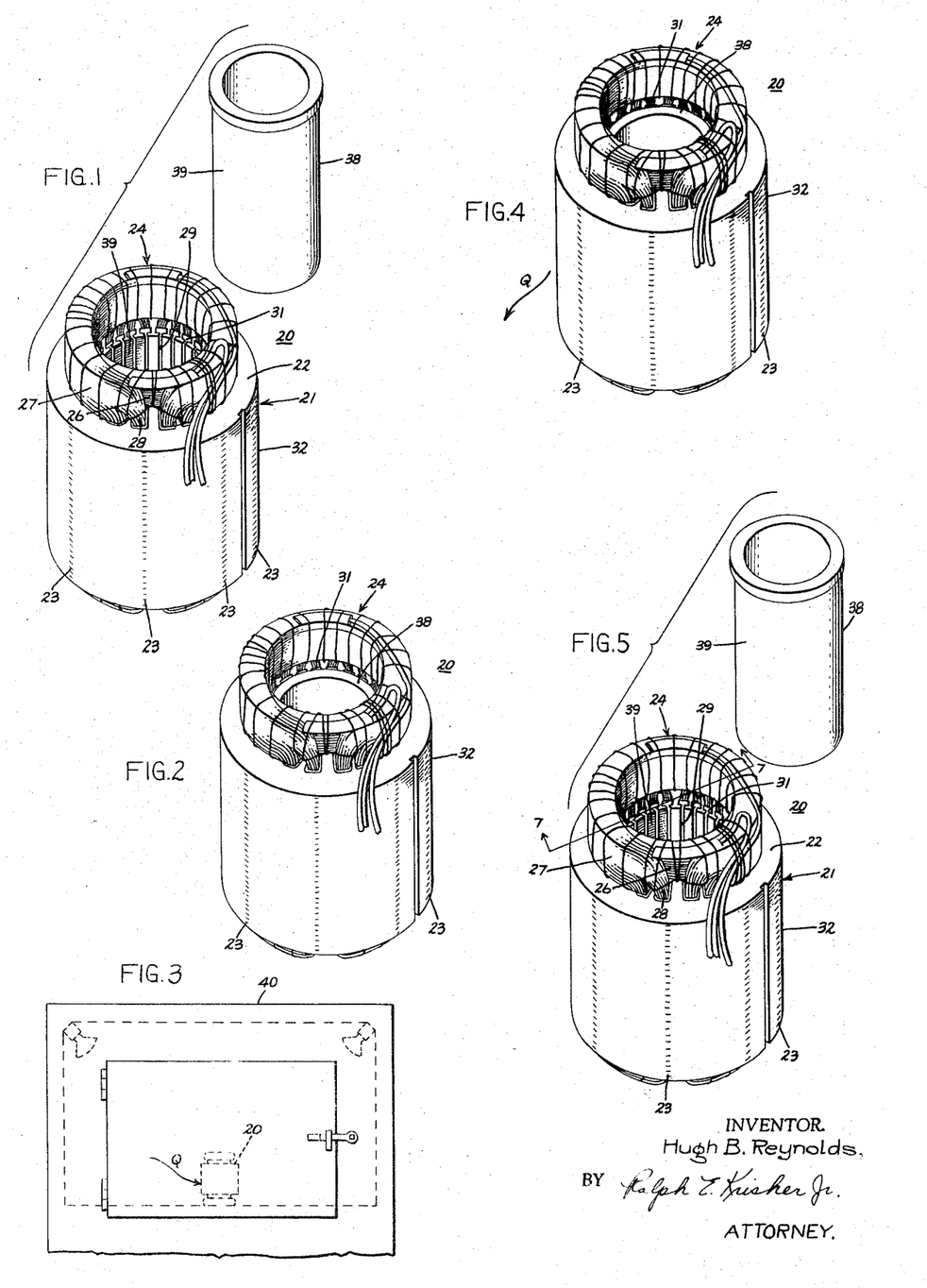
FIG. 1 is a perspective view of a laminated stator assembly and a cylindrical plug that may be utilized in the practice of the invention in one form.
FIG. 2 is a view of the assembly and plug of FIG. 1 with the plug positioned in the bore of the assembly.
FIG. 3 is a schematic illustration of the core assembly and plug while changing from an initial or ambient thermal state.
FIG. 4 is a view of the core assembly and plug of FIGS. 1 through 3 during a subsequent change in thermal state, such as would occur by cooling the plug and assembly after removal from an oven.
FIG. 5 is a view schematically illustrating the removal of the plug from the assembly after preselected dimensional relationships have been established along the bore surfaces of the assembly.

Now referring generally to the drawings and specifically to FIGS. 1 through 8, a laminated assembly 20 includes a stack 21 of component members that are illustrated as magnetic laminations 22 punched from conventional magnetic steel sheet of the type commonly used in the manufacture of dynamoelectric machine cores as is well-known. The stack of individual laminations illustrated in FIG. 1 are secured together both by weld beads 23 at spaced apart locations and by an interlaminate layer of adhesive material of the type described, 1 for example, in the previously identified Bobbie B. Hull patents.

The core assembly 20 also includes other component members in the form of windings 24 that are illustrated as including an auxiliary winding 26 and a main or running winding 27. These windings are accommodated in winding accommodating slots 28 each having a restricted slot entrance 29. Conventional wedges 31 are also shown as overlying the slot entrances and closing the slots.

Figure 6:
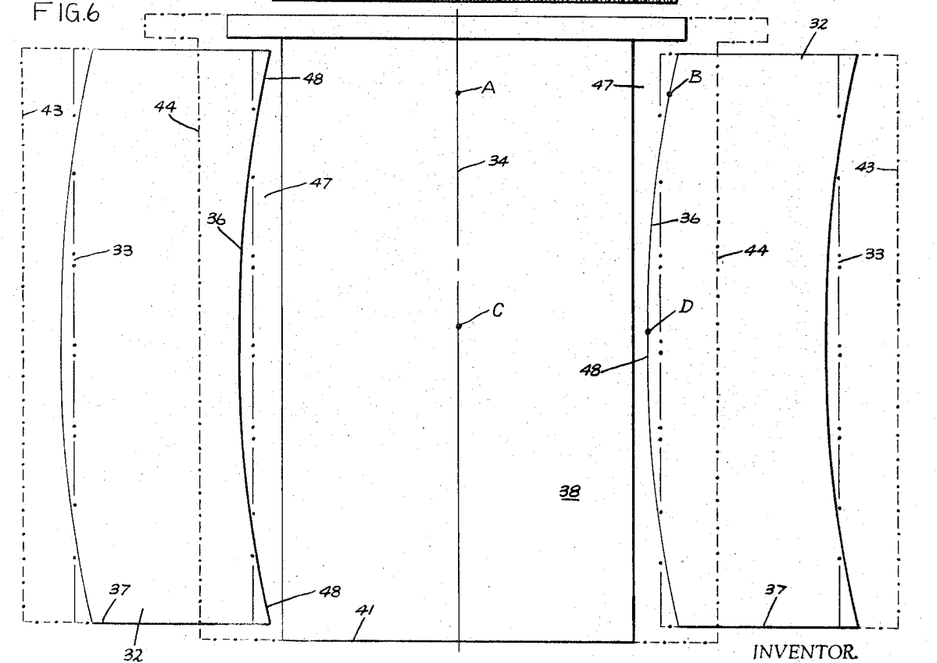
FIG. 6 is an exaggerated and enlarged, somewhat schematic representation of a cross sectional view through the plug and laminated core of FIGS. 1 through 5, with solid and broken lines representing the various dimensional relationships of the parts while in various thermal states.
Figure 7:
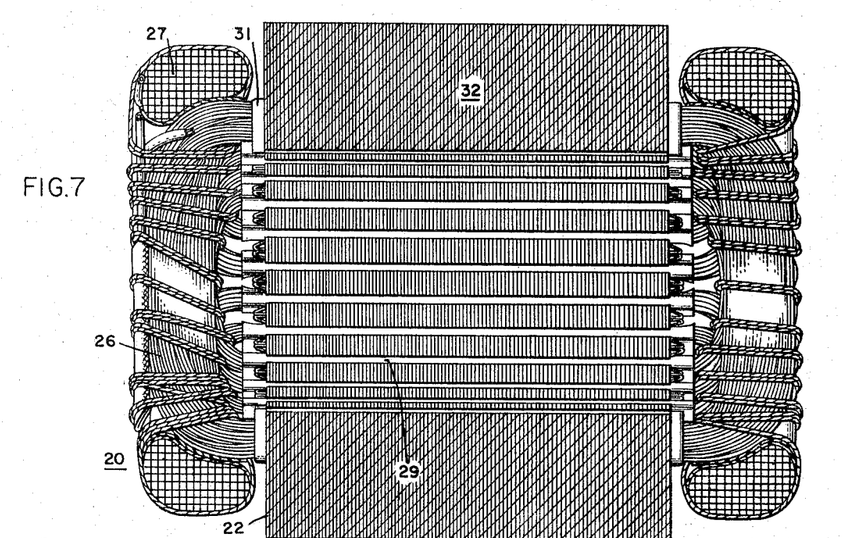
FIG. 7 is a cross sectional view taken along the lines 7—7 in FIG. 5.

With reference to FIG. 6 and the outline of a laminated core 32 represented by the broken lines denoted by the numeral 33, it will be appreciated that it is desirable for the bore of the assembly to be uniform and concentric throughout the length of the stack of laminations. One common method of measuring the uniformity and concentricity of a bore in a core assembly is to measure the dimensional relationships that exist between different points lying in the bore defining surfaces of the core assembly.

Thus, with reference to the centrally disposed axis 34 for the core 32, commonly used industrial gauges may be used to determine that all of the bore defining surfaces of the core are equidistantly spaced from the central axis as measured in a plane perpendicular to the axis 34. If an "out of round" bore condition exists, it will be indicated by a varying or changing radial dimension between the central core axis 34 and the bore defining surface.

On the other hand, if the bore is crooked or bowed as represented by the core surface 36 (indicated by the solid line 37 in FIG. 6), such condition will be indicated by the gauge as it is moved along the axis 34 of the core while measuring the radial distance between the axis of the core and the bore defining surface of the core. For example, when a crooked or bowed bore condition is encountered, the gauge would indicate a different radial measurement between the points A and B than between the points C and D as they appear in FIG. 6 of the drawings.

As described in the background of the invention set out hereinabove, experience has now shown that the predetermined dimensional relationships of the bore surfaces in a core assembly may undergo changes during various manufacturing procedures and even during storage after all manufacturing procedures have been completed. The cross sectional appearance of an acceptable bore would be substantially as indicated by the broken line outline 33 in FIG. 6. A nonacceptable crooked or bowed bore condition is indicated by the solid line 37 outline and is commonly simply referred to as a "tight bore" condition since the minimum radial dimension of the bore (between points C and D in FIG. 6) is usually less than a nominal minimum specified for the core assembly.

The practice of the present invention establishes desirable preselected dimensional relationships along the bore defining surfaces of a laminated assembly, and, somewhat surprisingly, these preselected relationships, once established as taught herein, appear to be stable thereafter.

Turning now once again to FIG. 1, one form of dimensional relationship establishing means is embodied as a generally cylindrical plug 38. The plug 38 is fabricated from a material selected to have suitable hardness characteristics and a coefficient of thermal expansion of a preselected general magnitude. As to hardness characteristics, it is preferable that the material utilized for plug 38 be sufficiently hard to permit daily use of the plug in manufacturing operations without the plug surface 39 becoming so eroded that it will no longer be useful in the practice of the invention. One suitable material that has been utilized is conventional aluminum mechanical tube marketed by ALCOA as material number 6061-T6. The published specifications for this particular type of tube show it to include about 0.25 percent copper, 0.6 percent silicon, 1.0 percent magnesium, 0.20 percent chromium, and the remainder aluminum and normal impurities.

In one specific exemplification, for use with cores having a bore diameter of 3.1255 ± 0.0020 inches, 3 ¼ inch O.D. tubing with a ⅝ inch wall thickness has been utilized having a final diameter of 3.1225 ± 0.0005 inches. These plugs were satisfactory when turned to the final diameter and also when turned to 3.1205 ± 0.0005 inches and then hard coat anodized to provide a hardened surface having the mentioned final diameter.

As above stated, the material from which plug 38 is fabricated should have a coefficient of thermal expansion and contraction when used with assembly 20 in the manner to be described, so that upon heating the plug 38 and assembly 20 to a preselected elevated temperature the plug will expand tightly against the bore defining surface or surfaces of the assembly. Preferably, when room ambient is about 25° centigrade, the preselected elevated temperature will be about 160° centigrade, for the above specified dimensions and tolerances of the plug and assembly. Under these conditions, the coefficient of thermal expansion of the plug 38 preferably is at least about 1.5 times that of the material from which the laminated core is fabricated.

Of course, if an operational sequence is to be followed wherein the plug and assembly are to be cooled below room ambient temperatures (or wherein an outer diameter or other peripheral surface is to be sized and shaped by a ring or other suitably shaped dimensioning means), the material for plug 38 would be selected to have a smaller coefficient of thermal expansion than that of the core material.

The aluminum material from which illustrated plug 38 was fabricated had a thermal coefficient of expansion and contraction of about $0.224 \times 10^{-4}$ inch per inch per degree centrigrade and that of the steel core was about $0.114 \times 10^{-4}$ inch per inch per degree centrigrade. In addition, I have concluded that for laminated steel cores, practically any nonferrous metal having suitable surface hardness characteristics may be used in plug 38. In fact, even some iron based alloys, including stainless steels, would also be useful for fabricating the plug 38.

As one exemplification of the practice of my invention in a preferred form, the plug 38 is manually inserted in the bore 39 of the assembly 20 under room ambient conditions, it being noted that the exact room ambient temperature is not critical. Then the thermal state of the assembly 20 and plug 38 is changed from the initial thermal state to a second preselected thermal state by transferring heat to the plug and assembly and elevating the temperature of both the assembly and plug. As previously pointed out, the outer surface 39 of the plug is accurately dimensioned, is uniformly concentric, and lies in close proximity to the bore defining surfaces of the assembly 20 while in the initial thermal state.

Then, during heating to about 160° centigrade, the plug 38 expands more rapidly than the bore of the assembly 20, and the plug forces the bore defining surfaces of the assembly to conform in size and shape to the outer surface of the plug. Thereafter, upon transferring heat away from the plug and assembly, e.g., by cooling the parts, both the plug and assembly shrink until the thermal states of the plug and assembly are returned to the initial states thereof. Since the plug contracts more rapidly than the assembly, the plug 28 may be hand removed from the bore of the assembly. At this time, the bore of the core has preselected dimensional relationship that have been determined by the surface configuration of the plug. An oven, as shown at 40 in FIG. 3, may be used while transferring heat, represented by the symbol Q, to the plug and assembly. Air cooling of the plug and assembly is acceptable as illustrated in FIG. 4 in order to transfer heat (again represented by the symbol Q) away from the plug and assembly. Removal of the plug 38 from the straightened and uniformly concentric bore of the assembly 20 is illustrated in FIG. 5.

Figure 8:
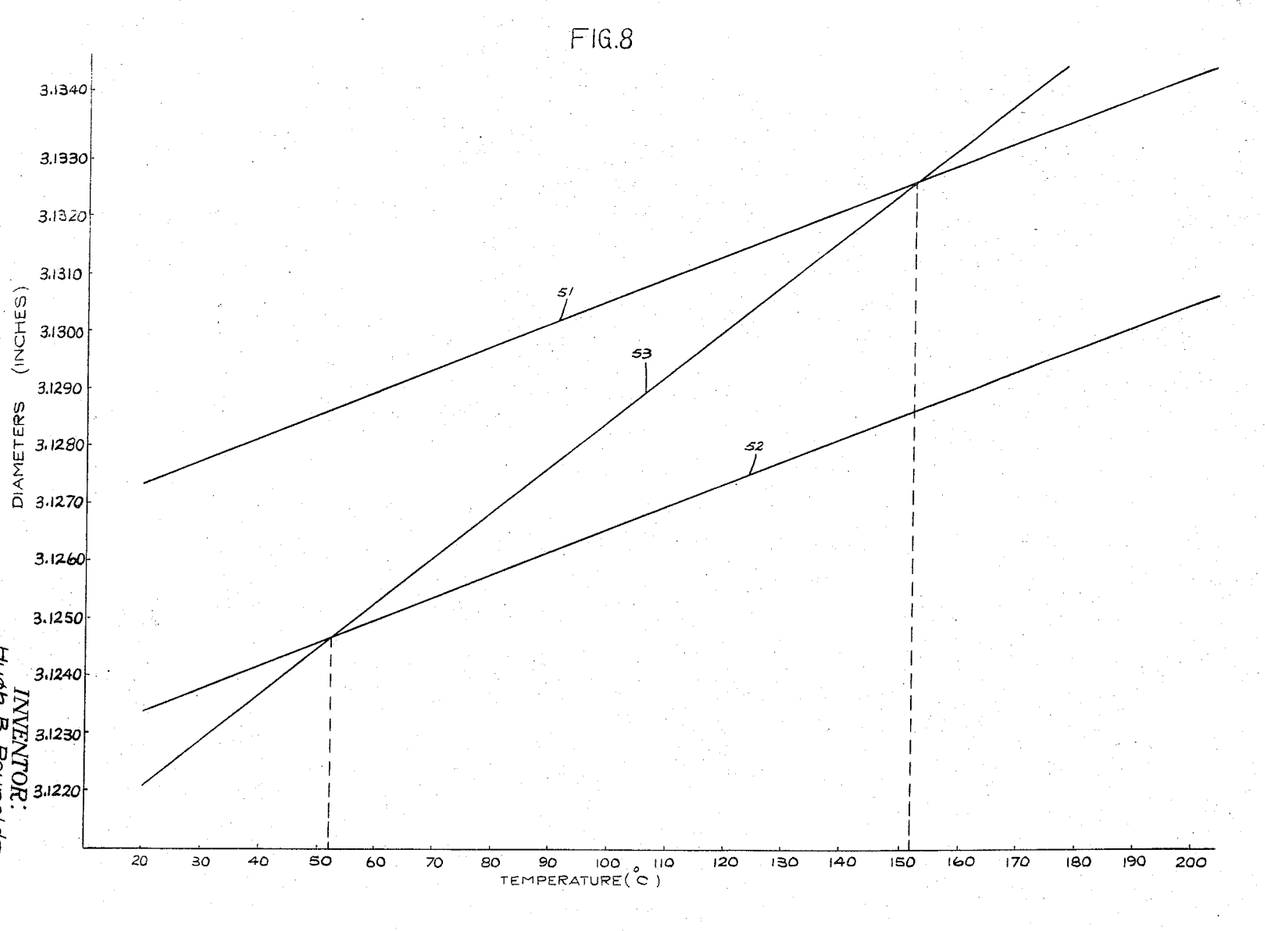
FIG. 8 is a plot of diameter (in inches) versus temperature (in degrees centigrade) both for bore diameters of assemblies and plugs generally corresponding to those illustrated in FIG. 1.

Turning now to FIG. 6, the operational sequence of the method just described will be analyzed with reference to FIG. 6 and FIG. 8. It is again emphasized that the FIG. 6 showing has been exaggerated for the purposes of description.

In FIG. 6, the solid line outline of the plug 38, represented by the solid line 41, denotes the surface configuration of the plug 38 while in an initial thermal state, both prior to, and upon completion of, the method steps described above. The core structure 32, however, has an initial configuration while in an initial thermal state as represented by the solid line drawing 37. The broken line 43 represents the outer surface of the core while it is at the elevated temperature, and broken line 44 represents both the outer surface of the plug 38 and the bore surface of the core 32 while they are maintained at the elevated temperature. The shape and preselected dimensional relationships of the bore surfaces of the core 32, upon return of the core to its initial thermal state, is represented by the outline of broken line 33. The final configuration of the assembly 20 is shown more clearly in FIG. 7.

Again having reference to FIG. 6, it will be noted that the air gap 47 (which is actual practice will only be about 0.0055 of an inch maximum for the specific core and plug shown), between the outer diameter of the plug 38 and the bore defining surfaces of the core 32, diminishes and becomes nonexistent as the plug and core assembly are undergoing a change from an initial thermal state to the second preselected thermal state. During expansion of the plug and core, the plug will first engage the surface regions 48 of the core and then, with continued expansion of the plug at a greater rate than that at which the core expands, the internal bore defining surfaces of the core will be uniformly engaged by the plug as indicated by the broken line outline 44.

With respect to the reasons why the desired preselected dimensional relationships are established during the process discussed above, it is believed at this time, that residual interlaminar stresses previously developed in the core 32 as a result of manufacturing procedures and steps, including the formation of the weld beads 23 and placement of windings in the core slots, are somehow counteracted during the above described process steps.

FIG. 8 graphically reveals the differential expansion and contraction of the plug 38 and internal bore of the assembly 20 during the practice of the method described in connection with FIGS. 1 through 7. In FIG. 8, curves 51 and 52 represent the diameter, at various temperatures, of the core 32 having a nominal dimension of 3.1250 inches. The curve 51 in this case represents a maximum nominal bore dimension of 3.1275 at room ambient of about 25° centigrade whereas the curve 52 represents a minimum nominal diameter of about 3.1235 at about 25° centigrade. The curve 53 on the other hand represents the nominal outer diameter of the plug 38 which, as described above, is about 3.1225 ± 0.0005 inches at about 25° centigrade. It will be understood from FIG. 8 that at ambient conditions of about 40° centigrade (about 105°F) or more, the plugs 38 will have a smaller diameter than the bore of the core 32 and may be hand placed therein. Then, while heating the core and plug, a nominal sized plug will expand against the bore surface of a minimum size core at about 52° centigrade, and the bore surface of a maximum size core at about 152° centigrade. Thus, by raising the temperatures of the plug 38 and core 32 to a temperature above 152° centigrade, the plug will size and shape the bore defining surfaces of even maximum sized cores.

During the heating step, which conveniently may be performed while hardening a varnish or epoxy material after it has been applied to all or1part of the windings and/or laminated structure, the surfaces of the expanding plug 38 bear against the bore defining surfaces of the assembly 20. The differential expansion of the plug and assembly results in the bore of the assembly 20 conforming to the size and shape of the tool being utilized, e.g., the plug 38. As the plug and assembly are then returned to their initial thermal state, as by cooling to room ambient conditions, the outer diameter of the plug returns to the nominal dimension thereof.

The process in its preferred form is advantageous for straightening and thus, in effect, repairing otherwise unacceptable stator cores and also for preventing previously acceptable laminated assemblies from being damaged during a final treatment or manufacturing operation.

For example, when the windings 24 are subjected to a final varnish dip and cure cycle, it is economical to dispense with bore machining and inspection steps prior to the final dip treatment and then, just after the varnish application step, insert the plug 38 in the bore of the assembly 20, and follow the elevated temperature cure cycle for the particular varnish or varnish type material being used. Since for most familiar winding treatment materials the cure cycle may involve temperatures of 165° centigrade or more, there should be no problem in assuring that the plug 38 will relieve all tight bore conditions for cores similar to the core 32.

The placement of the plug in the core does not require any more labor than the previously used final inspection step which, among others, now may be eliminated. The following Table I illustrates the improved and somewhat surprising results that have been obtained by practicing the present invention.

In preparation for the comparison test from which the data in Table I was taken, seven different models of would laminated assemblies, Models F-L, were considered. Samples of either 40 or 80 of each of the models were processed according to the exemplified method described above, whereas the prior process was utilized only with Models F through J.

Of the Models F-L, some were impregnated with the E. I. du Pont du Nemours and Co. LECTON material while others were impregnated with epoxy material. In addition, some of the models were end turn varnish treated while others were "total dipped." After curing (e.g., baking) the LECTON material and epoxy material in these test units at a temperature of about 160° centigrade or more for about 1 hour for LECTON material treated assemblies and about 5 hours for epoxy material treated assemblies, all units were inspected to determine the bore conditions of the assemblies and to determine whether the structures should be rejected for a tight bore condition (TB) because the assembly bore would not freely admit a 3.1235 inch diameter gauge plug the full length of the bore, or be rejected for an oversize bore condition (OSB) because the bore would admit a 3.1275 inch diameter gauge plug.

In Table I, the total number of each model treated by following conventional production methods and the exemplified process are recorded. Also presented are the total number of cores rejected upon completion of each process (and the percent rejected) because of tight (TB) or oversize bore (OSB) conditions.

Table I

| Model | Total | Conventional Method | | | Exemplified Process | | | | |
|---|---|---|---|---|---|---|---|---|---|
| | | Number | Rejects (TB) | % | Number | Rejects (TB) | % | (OSB) | % |
| F | 590 | 510 | 64 | 12.5 | 80 | 0 | 0 | 1 | 1.25 |
| G | 934 | 854 | 167 | 19.5 | 80 | 1 | 1.25 | 10 | 13.75 |
| H | 608 | 528 | 354 | 67.0 | 80 | 0 | 0 | 0 | 0 |
| I | 669 | 629 | 99 | 15.7 | 40 | 0 | 0 | 7 | 17.5 |
| J | 920 | 840 | 329 | 39.3 | 80 | 0 | 0 | 0 | 0 |
| K | 40 | | | | 40 | 0 | 0 | 0 | 0 |
| L | 40 | | | | 40 | 0 | 0 | 0 | 0 |
| Total: | | 3361 | 1013 | 30.2 | 440 | 1 | .23 | 18 | 4.3 |

By way of further explanation of the Table I data, all of the cores tested were inspected for tight and oversize bore conditions prior to the varnish treament, but no sorting because of bore condition was made. Furthermore, all of the assemblies that were subsequently rejected for OSB conditions had oversize bores prior to the application of varnish thereto. Thus, the practice of the exemplified process did not cause any assembly to become oversized. Furthermore, inspection of the single assembly that was rejected because of a tight bore condition after following the exemplified process revealed that one or more of the welds 23 in that assembly had apparently been broken and then repaired prior to the application of varnish thereto.

Thus, it will be appreciated that when only those assemblies rejected because of tight bore conditions are considered, the exemplified process resulted in only a single core (0.23 percent of the total) being rejected, whereas a rejection rate of over 30 percent was encountered while following the conventional method. As an additional point of information, for those models were epoxy material was used, a light film of silicone grease was applied to the plugs 38 in order to assure that the plugs would not stick to the bore defining surfaces of the assemblies being treated.

Based on the above described trails, it has been concluded that by following the exemplified process, the bore of a structure such as the structure 20, having a nominal bore diameter of 3.1255 inches, tends to shrink (upon heating to about 160° centigrade and then cooling to room ambient) up to 0.0007 inches. Also, out of roundness of such bores tends to be reduced up to about 0.0009 inches after such heating and cooling. In other words an "out of round" bore will tend to become less out of round. Furthermore, the exemplified process actually straightens and sizes the bores of the structures to within specified manufacturing tolerances.

In order to further emphasize the somewhat surprising results that may be attained by utilizing the present invention and to give an indication of the success that would be expected when the invention is put into commercial practice, the data in the following Table II is presented.

The data of Table II has been taken from records of prior commercial production experience for various models or types of motors and from information that has been gathered for the purpose of evaluating the value of the exemplified process disclosed herein.

In the following table, the type M wound stator cores were particularly adapted for single phase power supply applications where the stator is to be press-fit into a ousing. The type N wound cores were bonded cores and particularly adapted for bolt-down core mounting applications; whereas the type O wound cores had the windings placed therein by hand and were particularly adapted for three-phase power supply applications.

As in the case of the Table I data, the exemplified process identified in Table II corresponds to the preferred process disclosed by FIGS. 1–7 and the description thereof.

Where data for any given type of assembly was available from more than one production or trail run, each run and the data therefor are presented separately. The data itself indicates the percentage of assemblies that were rejected because of "tight bore" (TB) conditions at a final inspection station and the bores of which would have to be remedially machined or otherwise "reworked":

Table II

| Model | Run No. | Conventional Method % Rejected | Exemplified Process % Rejected |
|-------|---------|-------------------------------|-------------------------------|
| M | 1 | 26 | 0.26 |
|   | 2 | 48 | 0.36 |
|   | 3 | 42 | — |
| N | 1 | 13.5 | 0.11 |
| O | 1 | 52 | 1.57 |

From the data presented in the above Table II, it should now be appreciated that significant improvements in product quality as well as significant reductions in produce rejection rates result from utilizing the invention. More specifically, the rejection rate is indicated by the data of Table II to be reduced by more than two orders of magnitude.

The advantages and features of the present invention should now be clearly understood. It is now possible to produce improved laminated assemblies by a practical process particularly suitable for use in mass production facilities. The preferred process as described hereinabove may be advantageously utilized in the production of both stator and rotor cores for dynamoelectric machines.

Figures 9, 10, 11, 13:
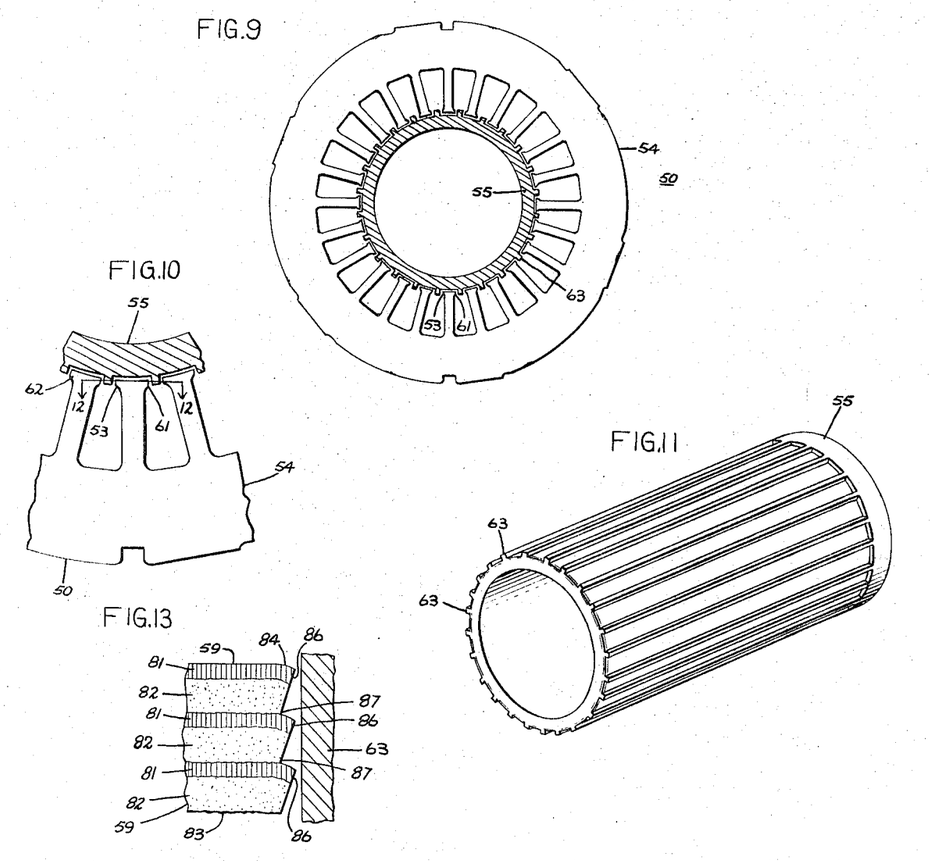
FIG. 9 is a view, with parts removed and parts in section, of another laminated assembly and another plug to assist in describing the practice of the invention in another form.
FIG. 10 is an enlarged segment of the structure shown in FIG. 9.
FIG. 11 is a perspective view of the plug shown in FIG. 9.
FIG. 13 is an enlarged and exaggerated view, with parts removed and parts broken away, of parts of the structure shown in FIG. 12.

Now turning to FIGS. 9 through 13 it will be appreciated that an enlarged view of a section of the structure shown in FIG. 9 is reproduced for clarity in FIG. 10. The materials from which the laminated assembly 50 and plug 55 are made would be the same as those described above in connection with the plug 38 and assembly 20. A process in the form now to be described is of particular advantage for the purposes of establishing a uniformly concentric bore in the assembly 50 and also for establishing uniform and smooth restricted slot entrances 53 through which components such as insulated windings may be moved during assembly with the laminated core 54.

When conventional procedures are followed, the restricted entrances 53 of a laminated core may present roughened and/or irregular surfaces which may damage insulation (such as magnet wire varnish or enamel) on windings that are inserted through the entrances.

Figure 12:
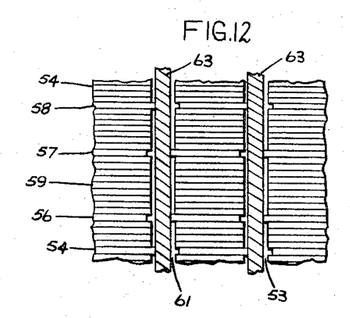
FIG. 12 is a view taken along the lines 12—12 in FIG. 10.

FIG. 12 illustrates one of the reasons for such irregularities. It will be noted in FIG. 12 that some of the laminations 54, 56, 57, 58 are slightly out of alignment with the remainder of the laminations 59 so that the restricted slot entrances 53, 61 (when greatly magnified) have what might be called a saw toothed surface. It will be understood that the misaligned laminations 54, 56, can gouge and cut the insulation on windings moving thereagainst.

In order to resolve this problem, the laminations 54 etc. are aligned or flattened with respect to the remainder of the laminations 59. In addition to removing the restrictions caused by a lamination such as the lamination 54, practice of the form of method now to be described can also relieve restricted slot entrance surface irregularities caused by burrs on individual lamination punchings.

When the plug 55 is utilized in the manner now to be described, the extensions or ribs 63 formed thereon are proximately disposed between adjacent tips of the lamination teeth, in the restricted slot entrances of the assembly 50. Then, upon changing the thermal states of the assembly 50 and plug 55, the plug (including ribs 63) will expand and establish a uniformly concentric bore as well as uniform and smooth restricted slot entrance surfaces having the desired dimensional relationships. Thereafter, upon cooling, the plug 55 and assembly 50 may be separated in the same manner as the plug 38 from the laminated assembly 20.

FIG. 13 is an enlarged, somewhat exaggerated view of a portion of the structure shown in FIG. 12. This figure is presented for the purpose of illustrating the saw tooth surfaces of a restricted slot entrance even in the absence of misaligned laminations such as laminations 54, 56, 57, 58 as shown in FIG. 12.

In the formation of the laminations 59 as shown in FIG. 13, the laminations are punched or stamped from a sheet or strip of steel. After being formed, the restricted entrance defining portions of the lamination teeth appear as shown in FIG. 13. It is believed that the striated appearing surfaces 81 of the laminations are formed as a result of shearing the lamination material, whereas the stippled appearing surfaces 82 are formed as a result of tearing or breaking the material. After formation, the laminations have burrs along the bottom edge thereof as shown at 83. The edge portions 84 of the laminations are also deformed and slightly bent as illustrated. When aligned and stacked as illustrated, the ends of the laminations form, as illustrated, a saw tooth pattern comprised of teeth 86 and valleys 87.

It should be understood that by compressively urging the rib 63 against the illustrated teeth 86, at least the tips of the teeth will tend to be flattened and deformed toward the valleys 87. Thus, the restricted entrance surfaces of a core comprised of laminations like those shown in FIG. 13 will tend to be more desirably configured when utilizing the method as described in connection with FIGS. 9-13.

For completeness of description, it should also be noted that, for the assembly 20, the lamination stack height was five inches and the outer diameter of the core was about 6 ¼ inches. Furthermore, the width of the slot openings or restricted entrances of each lamination was about 0.100 of an inch although, after assembly of the core, this dimension was more typically about 0.087 of an inch. It is believed that the reasons for this reduction in slot opening was because of conditions such as those just described in connection with FIGS. 12 and 13.

By way of still further explanation, it should be noted that daja collected from prior experience shows that the percentage of rejected and reworked assemblies because of tight bore conditions seems to increase with increased stack heights. For example, if the rework rate for production of 2 ¾ inch stack height cores were about 10 percent to 12 percent, the rework rate for 4 inch stack height cores would be about 35 percent to 40 percent. Accordingly, it will be understood that the practice of the preferred forms of the invention as described thus far will be of particular advantage for relatively long stack height cores, e.g., cores with stackheights or lengths of three inches and more.

Figure 14:
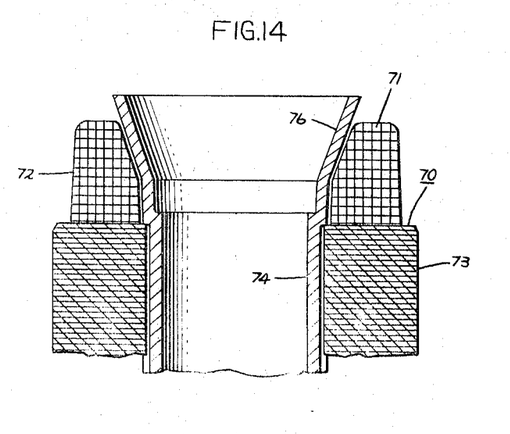
FIG. 14 is a view, with parts broken away and parts in section, that illustrate the practice of the invention in still another form.

FIG. 14 illustrates the practice of the invention in still another form, as it may be utilized to establish preselected dimensional relationships of the bore defining surfaces of the laminated assembly 70 and also such relationships for the end turns 71 of winding 72 supported on the core 73. With the FIG. 14 exemplification, during the heating step, the plug 74 will expand at a greater rate than both the steel core 73 and the copper windings 72. Thus, the winding end turn portions 71 will have preselected dimensional relationships as determined by the extended portion 76 of1the plug 74.

In the foregoing discussion, reference has been made to completed assemblies, e.g., magnetic cores wherein adjacent laminations are held together in stacked relation by mechanical stack securing means such as welds or keys, or combinations thereof. Reference has also been made to manufactured core assemblies wherein a hardened thermoresponsive adhesive material (e.g., a thermosetting acrylic or epoxy resin type varnish) has been utilized to bond together adjacent laminations in a stack and/or groups of winding turns on the core.

It will now be understood that the practice of the invention in the preferred forms thereof will be particularly useful in the manufacture of assemblies wherein heat hardenable adhesive material is used, whether or not the mechanical stack securing means just referred to are also utilized. When using heat hardenable adhesive materials, the application of heat for hardening the adhesive material may also be utilized to differentially expand a plug or other dimensional relationship establishing means. Furthermore, as the desired dimensional relationships are achieved along selected portions of an assembly, the concurrent or subsequent hardening of the thermoresponsive material will assist in holding the assembly components together in the desired relative positions.

While in accordance with the Patent Statutes, I have described what at present are considered to be the preferred embodiments of the invention, it will be obvious to those skilled in the art that numerous changes and modifications may be made therein without departing from the invention, and it is therefore aimed in the appended claims to cover all such equivalent variations as fall within the true spirit and scope of the invention.

What I claim as new and desire to secure by Letters Patent of the United States is:

1. A method of manufacturing an assembly for a dynamoelectric machine including a core formed of a plurality of laminations of ferro-magnetic material and having a plurality of teeth with edges of the extremities of the teeth defining a bore, the method including: axially aligning the magnetizable laminations in stacked relation and forming the assembly with edges of the lamination teeth defining circumferentially spaced apart bore surfaces of the core; positioning a member formed of a material selected to have a coefficient of thermal expansion different than the coefficient of thermal expansion of the material forming selected portions of the assembly, in close proximity to such selected portions of the assembly while the member and the selected portions of the assembly are in a first thermal state; initially transferring heat relative to the member and the assembly, to cause a first dimensional change in the member and assembly, and to force the selected portions to conform to the configuration of the portion of the member proximate thereto; subsequently transferring heat relative to the member and assembly to cause a second dimensional change in the member and material forming selected portions of the assembly thereby to return the member to the first thermal state and preselected physical configuration thereof, and to establish the preselected dimensional relationships between selected surface portions of the assembly; and separating the member and assembly the assembly including a winding having at least one group of end turns, the member including a portion for disposition proximate to the at least one group of end turns; and wherein initially and subsequently transferring heat to the member and assembly cause the portion of the member to shape the at least one group of end turns into conformity with the surface configuration of such portion.

2. The method of claim 1 wherein the core is steel; the member is metallic, includes aluminum at least as the major constituent thereof, and has a predetermined configuration; and the step of transferring heat includes heating the member and core to a temperature below the melting temperature of aluminum to expand the member against the steel core, with the member expanding into compressive engagement with at least some of the spaced apart bore surfaces of the core; the step of subsequently transferring heat comprises cooling the member and core; and the step of separating includes removing the member from the core.

3. A method of manufacturing an assembly comprised of a plurality of component members including a plurality of laminations each having a central bore and a plurality of teeth defining winding accommodating openings therebetween and wherein the laminations are arranged in a stack to form a magnetic core having a central bore and a plurality of teeth, the method including establishing preselected dimensional relationships between selected surface portions of the assembly with such portions defined by a material having a predetermined first coefficient of thermal expansion, the method comprising the steps: positioning dimension relationship establishing means, formed of a material selected to have a coefficient of thermal expansion different that the first coefficient of thermal expansion and having a predetermined physical configuration while in a first thermal state, in close proximity to the selected surface portions of the assembly while the material defining the selected surface portions and the relationship establishing means are in a first thermal state, the relationship establishing means including at least one metallic member having a plurality of extensions arranged for disposition between adjacent teeth of the core; heating the metallic member and magnetic core thereby to expand the metallic member and magnetic core, with the member expanding into compressive engagement with at least some of the surfaces of the magnetic core and forcing at least the selected surface portions of the assembly to conform to the configuration of the portion of the relationship establishing means proximate thereto; subsequently cooling the member and magnetic core thereby to cause a second dimensional change in the material defining the selected surface portions of the assembly and in the relationship establishing means, to return the relationship establishing means to the first thermal state and preselected physical configuration thereof, and to establish the preselected dimensional relationships between selected surface portions of the assembly; and separating the relationship establishing means and assembly by removing the member from the magnetic core; the step of positioning including placing the extensions between adjacent teeth of the magnetic core; and the step of heating the metallic member and core including heating the extensions and thereby expanding the extensions into compressive engagement with at least portions of at least some of the core teeth.

4. A method of manufacturing an assembly of component members for a dynamoelectric machine including a core formed of a plurality of magnetizable laminations having circumferentially spaced apart bore defining teeth, and including at least one winding supported on the core, the method including establishing preselected dimensional relationships between selected surface portions of the assembly, the method comprising: applying unhardened material that will adhere to at least a selected portion of at least one of the component members, positioning dimensional relationship establishing means having a predetermined size and shape in close proximity to the selected surface portions of the assembly; heating the establishing means, assembly, and unhardened material to a temperature in a predetermined temperature range; effecting a dimensional change in the dimensional relationship establishing means whereby such means and selected surface portions move into compressive engagement thereby to force the selected surface portions to conform to a configuration determined by such means; hardening the unhardened material while heating the assembly, and thereby causing the material to adhere at least to the selected portion of the at least one of the component members; and cooling the assembly to an initial thermal state.

5. The method of claim 4 wherein the selected surface portions comprise surfaces of the bore in the magnetizable core, the establishing means includes a member formed from a material comprising aluminum that is dimensioned for receipt in the bore, and positioning the dimensional relationship establishing means includes placing the at least one member in the bore.

6. The method of claim 4 where the establishing means includes a member formed from stainless steel, the bore of the core is initially crooked prior to heating and cooling the assembly, and the bore of the core is straightened by the stainless steel member as a result of heating and cooling the assembly with the stainless steel member disposed in the bore of the assembly.

7. A method of manufacturing a dynamoelectric machine assembly comprising a plurality of component members including a stack of magnetizable laminations and establishing preselected dimensional relationships between selected surface portions of the assembly, the method comprising: applying unhardened adhesive material to at least selected ones of the component members; positioning dimensional relationship establishing means having a preselected physical configuration in close proximity to the selected surface portions; effecting a first dimensional change in such means by heating the means to cause thermal expansion thereof and forcing the selected surface portions to conform to the configuration of the portion of the means proximate thereto; hardening the adhesive material while heating the means thereby to bond the adhesbie material to selected ones of the component members; effecting a second dimensional change in the means; and separating the means and assembly.

8. A method of manufacturing a dynamo-electric machine assembly comprising a plurality of component members and establishing preselected dimensional relationships between selected surface portions of the assembly with such portions defined by a material having a predetermined first coefficient of thermal expansion, the method comprising: applying unhardened heat hardenable adhesive material to at least selected ones of the component members; positioning dimensional relationship establishing means formed of a material selected to having a coefficient of thermal expansion different than the first coefficient of thermal expansion and having a preselected physical configuration in close proximity to the selected surface portions; effecting a first dimensional change in the relationship establishing means and forcing the selected surface portions to conform to the configuration of the portion of said means proximate thereto; hardening the adhesive material; effecting a second dimensional change in said means; and separating said means and assembly; the step of effecting a dimensional change including transferring heat to the relationship establishing means and to the material defining the selected surface portions, thereby to cause the first dimensional change, harden the adhesive material, and bond the adhesive material to at least the selected ones of the component members.

9. The method of claim 8 wherein the selected surface portions of the assembly establish at least one opening extending along the assembly, said means includes at least one member adapted to be positioned in the at least one opening, and the step of positioning includes placing the at least one member in the at least one opening.

10. A method for use in the manufacture of a dynamoelectric machine stator assembly having a desired bore configuration, the assembly at least including a ferro-magnetic core having a bore, and organic insulating material; the method comprising: positioning dimensional relationship establishing means in the bore of the core while the core is at an initial ambient temperature, the dimensional relationship establishing means having a size and shape to fit in the bore of the core while such means is at a temperature that at least approximates the initial ambient temperature and the dimensional relationship establishing means being formed of a material having a coefficient of thermal expansion greater than that of the core; heating the dimensional relationship establishing means, the core, and the insulating material to an elevated temperature predetermined to be both sufficiently low to be nondestructive of the insulating material and sufficiently high to cause the dimensional relationship establishing means to compressively engage the core defining portions of the core and to force movement of at least some surface portions of the bore relative to other surface portions of the bore, so that the bore of the core will conform to the shape of the dimensional relationship establishing means without destruction of the insulating material; and thereafter cooling the dimensional relationship establishing means, core, and insulating material to a final ambient temperature; to thereby establish a uniformly concentric bore configuration without destruction of the insulating material in the assembly.

11. The method of claim 10 wherein the elevated temperature is not substantially greater than two hundred degrees centigrade above an initial ambient temperature.

12. The method of claim 10 wherein the bore of the core is bowed when at the initial ambient temperature, and the compressive engagement of the dimensional relationship establishing means at the elevated temperature causes the bore defining surfaces of the core to be substantially equidistantly spaced from a central axis as measured along such central axis for the length of the core when the core is coold to the final ambient temperature.

13. The method of claim 12 wherein the elevated temperature is of the order of magnitude of 200° centigrade.

* * * * *